United States Patent
Rau et al.

(10) Patent No.: US 8,631,728 B2
(45) Date of Patent: Jan. 21, 2014

(54) RADIAL CENTERING SURFACE OF A STATOR CORE

(75) Inventors: Eberhard Rau, Korntal-Muenchingen (DE); Thomas Berger, Ditzingen (DE); Martin Henne, Moeglingen (DE); Klaus Pflueger, Eberdingen (DE); Rob Berry, Bridgend (GB)

(73) Assignee: Robert Bosch GmbH, Stuttgart (DE)

( * ) Notice: Subject to any disclaimer, the term of this patent is extended or adjusted under 35 U.S.C. 154(b) by 84 days.

(21) Appl. No.: 11/781,506

(22) Filed: Jul. 23, 2007

(65) Prior Publication Data

US 2008/0067886 A1 Mar. 20, 2008

(30) Foreign Application Priority Data

Jul. 24, 2006 (DE) .......................... 10 2006 034 109

(51) Int. Cl.
*H02K 15/02* (2006.01)

(52) U.S. Cl.
USPC ....... 83/13; 83/698.91; 83/375; 310/216.004; 29/609

(58) Field of Classification Search
USPC .......... 83/13, 55, 698.91, 375, 613, 668, 679, 83/681, 618–620; 310/216.004, 254.1; 29/609, 598
See application file for complete search history.

(56) References Cited

U.S. PATENT DOCUMENTS

| | | | | |
|---|---|---|---|---|
| 2,526,741 A | * | 10/1950 | Goemaere | 83/164 |
| 3,958,325 A | | 5/1976 | Rick et al. | |
| 4,578,853 A | * | 4/1986 | Wurth | 29/598 |
| 4,584,917 A | * | 4/1986 | Blom | 72/446 |
| 4,951,537 A | * | 8/1990 | Bennett | 83/76.6 |
| 6,147,431 A | * | 11/2000 | Asao et al. | 310/216.004 |
| 7,010,846 B2 | * | 3/2006 | Nakamura | 29/596 |
| 7,129,614 B2 | | 10/2006 | Hahn et al. | |
| 2006/0125339 A1 | | 6/2006 | Hahn et al. | |

FOREIGN PATENT DOCUMENTS

| | | |
|---|---|---|
| DE | 1116310 | 11/1961 |
| DE | 23 44 193 | 3/1975 |
| JP | 05-091683 | * 9/1993 |
| WO | 2004/030185 | 4/2004 |

* cited by examiner

*Primary Examiner* — Phong Nguyen
(74) *Attorney, Agent, or Firm* — Michael J. Striker

(57) ABSTRACT

A method for manufacturing a radial centering surface on an outer circumference of an annular laminated core of a stator comprises the steps of forming a stator with a hollow cylinder from strip-shaped laminations, preloading the stator axially before and during cutting, creating centering surfaces on an outer circumferential of the stator by using at least two cutting tools.

5 Claims, 10 Drawing Sheets

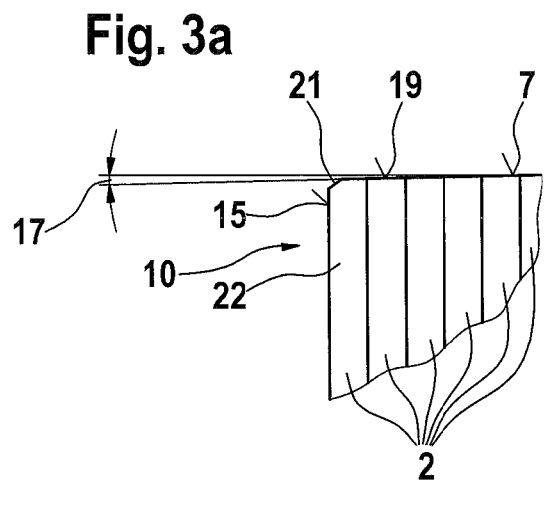
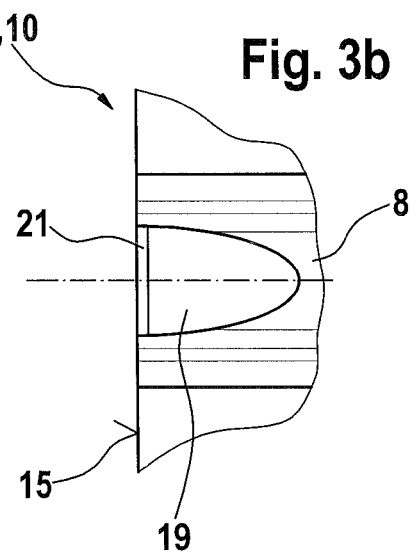
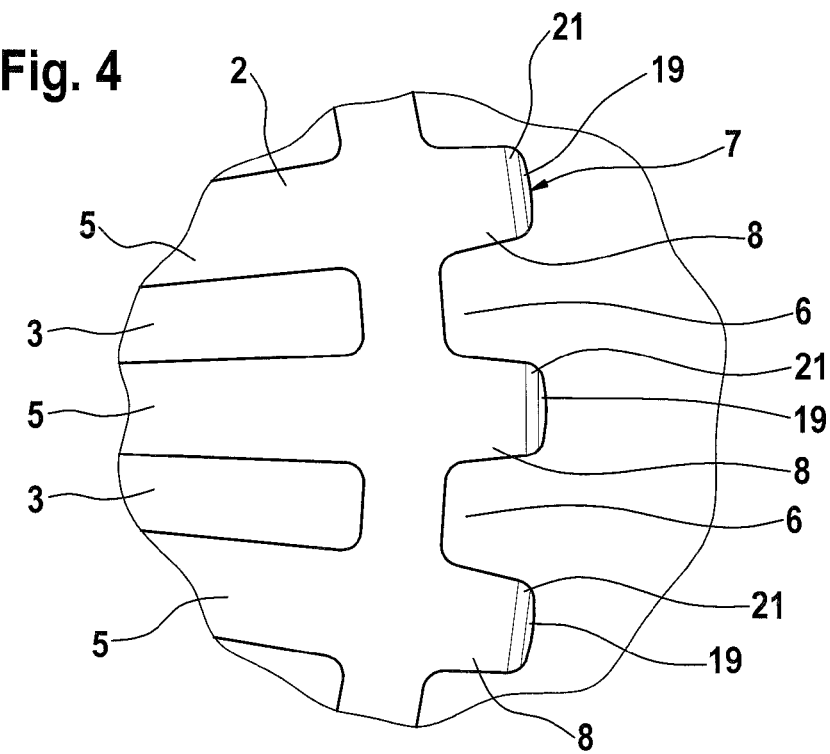

RADIAL CENTERING SURFACE OF A STATOR CORE

CROSS-REFERENCE TO RELATED APPLICATION

The invention described and claimed hereinbelow is also described in German Patent Application DE 10 2006 034 109.0 filed on Jul. 24, 2006. This German Patent Application, whose subject matter is incorporated here by reference, provides the basis for a claim of priority of invention under 35 U.S.C. 119(a)-(d).

BACKGROUND OF THE INVENTION

The present invention relates to a device and a method for manufacturing at least one radial centering surface on an outer circumference of an annular laminated core of a stator for an electrical machine, an electrical machine manufactured according to this method, and a stator—manufactured according to this method—for an electrical machine.

With the "axially-tensioning method", which is used with electrical machines, e.g., a motor vehicle generator, a reliable axial position of the stator relative to the end shields of the generator must be attained, and the stator must be centered exactly relative to the rotor located in the stator. A centering surface on an outer circumference of the laminated core makes it possible to locate the stator extremely exactly in the end shields, and to assign the stator to the rotor extremely exactly.

Methods for manufacturing a radial centering surface of this type are known from the related art. Unexamined patent application DT 23 44 193 A1 discloses a method, with which the centering surface is created via plastic deformation. When the stamping tool used is opened, individual laminations of the laminated core or regions thereof remain stuck on the tool and are pulled off of the laminated core. The centering surface is damaged via the bent laminations, and the stator is no longer installable. Since the damage occurs at the end of the value chain, the waste costs are high.

Publication WO 2004/030185 makes known a chip-removing machining method that involves truing a centering surface. It may happen that one or more laminations become detached from the laminated core due to the high radial load.

SUMMARY OF THE INVENTION

The inventive method provides that the centering surface is created by cutting. "Cutting" means separating a piece from a raw piece or a semi-finished piece without generating a shapeless substance (chips). This means that, after the cutting process, the work piece and the piece that was separated or cut therefrom have a defined shape. When cutting is carried out, a desired end result is attained using a single working/cutting process. The cutting on an end face of the laminated core is advantageously carried out in essentially the axial direction. This offers the advantage that the cutting does not result in a burr being produced on the end face, which could prove problematic on the shared contact surface when installed in an end shield, and that the laminated core also becomes plastically deformed in the axial direction on the end face, thereby considerably reducing the elasticity and resilience of the laminated core in the axial direction, in particular in conjunction with the screw connection between the two end shields, which improves the fastening between the two end shields, since elastically deformable sections of the laminated core have been reduced via the plastic deformation. When the laminated core includes teeth on the outer circumference, which point outwardly and are formed across the entire width of the laminated core, the radial centering surface is composed of tooth-centering surfaces formed on the teeth.

According to a refinement of the present invention, at least one cutting tool with at least one annular or curved cutting lip is used for cutting. As a result, when a cutting process is carried out, a desired radius of the centering surface on the outer circumference of the laminated core is easily attained. It would also be possible, of course, to use a cutting tool with a straight cutting lip. In this case, a great deal more cutting processes are required as the roundness of the centering surface desired increases. When an annular cutting lip is used, only one cutting process is required to create the entire centering surface. When a curved cutting lip is used, several cutting tools are advantageously distributed around the outer circumference of the laminated core, and they perform a cutting motion simultaneously. The laminated core and/or the tool are advantageously rotated around a certain angle of rotation after one cutting process—regardless of whether it is carried out using one or more cutting tools—so that the centering surface is created on the entire outer circumference. This is not necessary, of course, when the number of cutting tools corresponds to the number of outwardly-pointing teeth of the laminated core.

Advantageously, the cutting tool is guided parallel to the axis of the laminated core, thereby resulting in a circular-cylindrical centering surface. The centering surface created in this manner does not have a burr and may therefore be easily guided into a corresponding receptacle of an end shield or housing.

According to the present invention, the tool is moved—during manufacture of the circular-cylindrical centering surface—so far that at least one lamination of the laminated core is penetrated completely by the cutting lip. During the cutting process, one or more laminations are therefore cut completely, and the cutting lip does not penetrate a lamination without separating it, because a notch would otherwise be created in the lamination located behind—in the cutting direction—the lamination cut most recently. The notch would negatively affect stability and the electromagnetic function of the stator.

According to a refinement of the present invention, the cutting tool is guided at an angle to the axis of the laminated core, thereby resulting in a conical centering surface. The centering surface designed in this manner further simplifies the assembly and centering of the laminated core on an end shield. In contrast to the circular-cylindrical centering surface, it is also possible to only use the curved cutting lip. When the cutting tool is guided at an angle to the axis of the laminated core, the cutting lip moves into open space after cutting. It is not necessary for the laminations to be penetrated by the cutting lip across their entire width. The stator is prevented from tilting relative to the circular-cylindrical centering surface by inserting it into a related receptacle of an end shield or housing.

According to a refinement of the present invention, the angle between the feed of the cutting tool and the axis of the laminated core is chosen to be less than 5 degrees. As a result, simple manufacture of the centering surface is made possible, and, since the machined centering surface is located inside an end shield or housing, anti-corrosion measures for the machined surface are simpler.

The laminated core is advantageously preloaded axially before cutting. The advantage is that impermissible plastic deformations are prevented, e.g., a fanning of the laminations and/or damage to one or more laminations when the cutting tool is retracted.

The present invention also relates to a stator for an electrical machine, in particular for an electrical machine of a motor vehicle, with an annular—initially cuboid, in particular—laminated core that is bent into a round shape after a stator winding is installed. The laminated core includes at least one radial centering surface on the outer circumference that is manufactured by cutting. The centering surface of a laminated core that includes radially outwardly directed teeth across its entire width is composed of centering surfaces created on the teeth. The centering surface is advantageously suited for orienting the stator or the laminated core, e.g., on an end shield or a bearing flange. When the stator includes two inventive centering surfaces, it may be clamped, e.g., between two end shields.

The present invention also relates to a device for manufacturing a radial centering surface on an outer circumference of an annular laminated core of a stator, which includes axial end faces. The device includes a cutting tool, which is movable essentially axially relative to the laminated core and includes at least one cutting lip, which points toward one of the end faces of the laminated core. The device advantageously includes a stator centering device, with which the stator is initially oriented and is held in position for the subsequent cutting process. The advantages of the method described above result when the cutting process is carried out. Advantageously, at least two cutting tools are positioned such that centering surfaces are created simultaneously on both sides of the laminated core.

Advantageously, the cutting lip is annular in design, so that a single cutting motion results in a circular-cylindrical centering surface being created on the entire outer circumference of the laminated core.

According to a refinement of the present invention, the cutting lip is curved in design, and the centering surface is therefore created in sections. This is advantageous, in particular, when creating a conical centering surface, in the case of which the feed of the cutting tool takes place at an angle that is advantageously less than 5 degrees relative to the axis of the laminated core.

To this end, the stator receptacle is advantageously supported such that it is rotatable around the axis of the laminated core, thereby making it possible to create the centering surface in sections.

According to the present invention, an axially-tensioning device for the laminated core is provided, so that the laminated core is under axial preload during the cutting process, and thereby preventing impermissible plastic deformations, e.g., a fanning of the laminations and/or damage to one or more laminations when the cutting tool is retracted.

The present invention also relates to an electrical machine with two end shields and/or bearing flanges, and a stator, as described above. The stator is tensioned axially between the two end shields and/or bearing flanges. The end shields advantageously include two stator receptacles, which interact with the centering surfaces of the stator.

BRIEF DESCRIPTION OF THE DRAWING

The present invention is explained in greater detail with reference to a few figures.

FIG. 3 a) shows a detailed view of the centering surface, in a cross section,
FIG. 3 b) shows a centering surface in a top view,
FIG. 4 shows a detailed side view of the stator.

DESCRIPTION OF THE PREFERRED EMBODIMENTS

Figure 1:
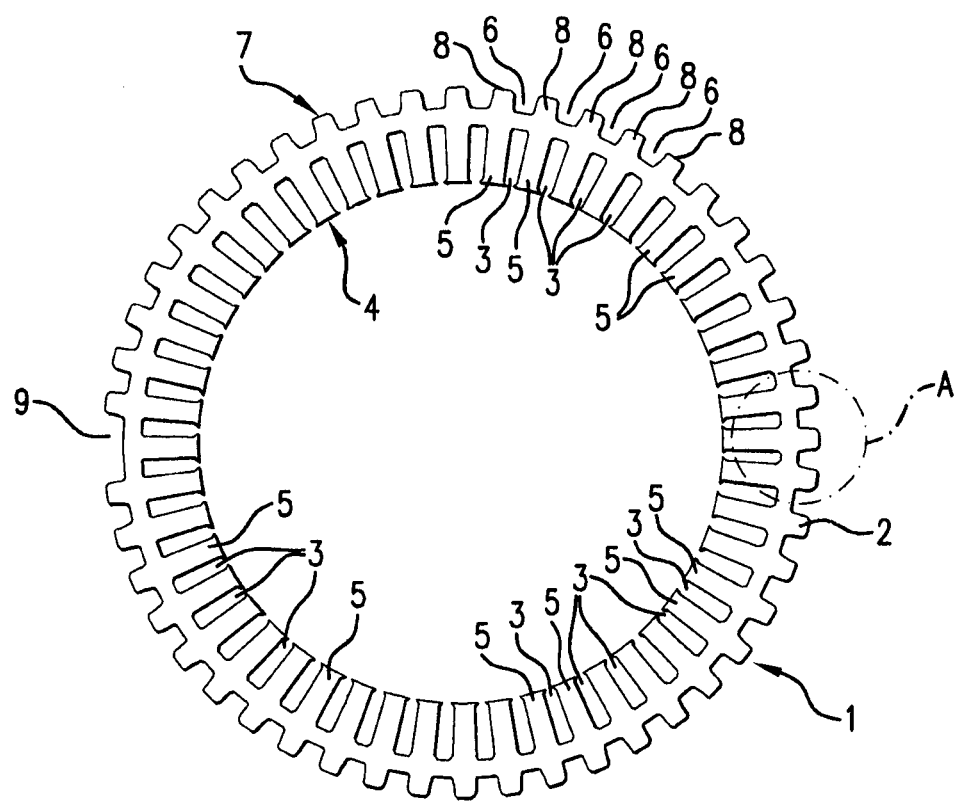
FIG. 1 shows an inventive stator, in a side view.

FIG. 1 shows a side view of an exemplary embodiment of an inventive stator 1, which was manufactured using the "flat lamination method". A (stator) winding is not shown in this figure, nor in FIGS. 2 through 7 and 12. Starting with strip-shaped laminations 2, an essentially cuboid laminated core is formed, which is then bent round to form an annular shape. Laminations 2 include slot openings 3 on inner side 4 of laminations 2, which are bounded on both sides by a tooth 5, and slot openings 6 on outer side 7, which are bounded on both sides by a tooth 8. On outer side 7, laminations 2 include a gap 9 in the row of teeth 8, which may be used, e.g., to position the stator in a housing or on an end shield of an electrical machine, e.g., a generator.

Figure 2A:
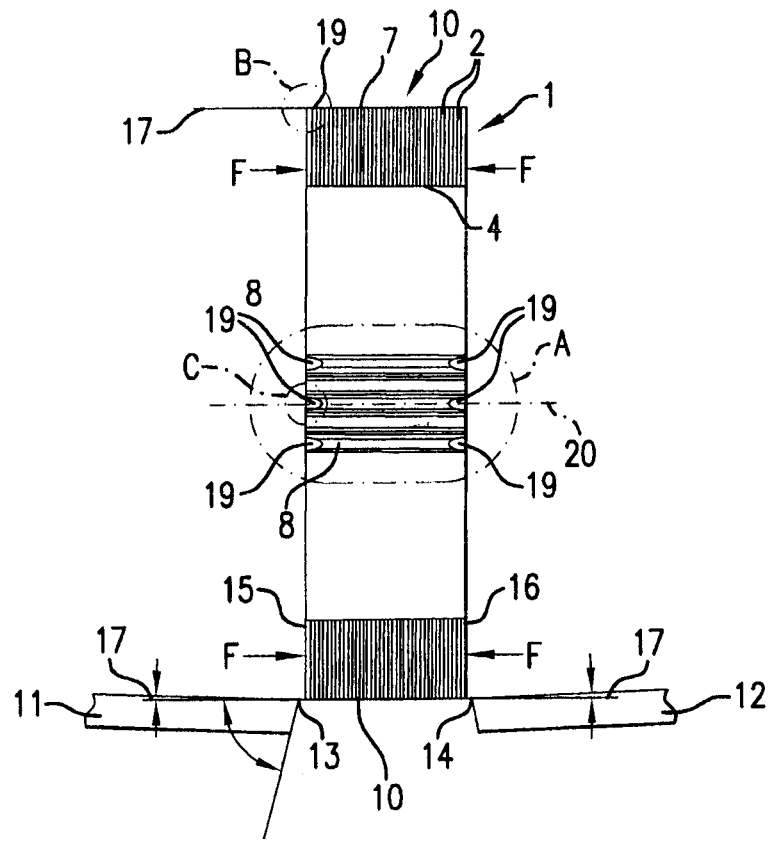
FIG. 2A shows the stator and cutting tools in a partial sectional illustration of a top view, and,
FIG. 2B shows the centering surface 19 of FIG. 2A in detail.
Figure 2B:
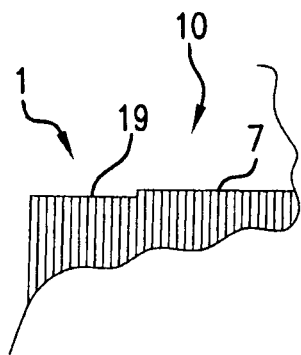

FIG. 2 shows a top view of stator 1 in FIG. 1 in a partial sectional illustration. A region A, which is circled in FIG. 1, is not shown in a sectional view. Laminated core 10, which is formed out of laminations 2 and forms the stator, is clearly visible in the side view. Two cutting tools 11 and 12 are shown in the lower region, cutting lips 13, 14 of which point toward one of the end faces 15, 16 of laminated core 10. Cutting tools 11, 12 are positioned at an angle 17 relative to outer side 7 of laminated core 10, so that inventive centering surface 19 is produced on outer side 7 of a tooth 8 in a cutting process. Cutting lips 13 and 14 are advantageously curved in design.

FIG. 3 a) shows a section B of FIG. 2 in a detailed view. A portion of laminated core 10 with a centering surface 19 formed thereon is shown. Centering surface 19 is formed at an angle 17 relative to outer side 7 and axis 20 of stator shown in FIG. 2. In addition to centering surface 10, an optional bezel 21 is formed on outermost lamination 22. Bezel 21 is also advantageously created in a cutting process.

Non-cut region A in FIG. 2 shows three teeth 8 in a top view, on the end faces of each of which a centering surface 19 is formed. FIG. 3b) shows, in a detailed view, the region indicated with circle C in FIG. 2, which shows the front end of center tooth 8. Starting at end face 15, bezel 21 is formed first, followed by centering surface 19. Due to the shape of tooth 8, conical contour 23 of centering surface 19 results.

FIG. 4 shows region A in FIG. 1, in an enlarged view. Teeth 8 include centering surface 19 and optional bezel 21 on outer circumference 7. Centering surface 19 makes it possible for stator 1 to be easily accommodated in a corresponding receptacle of the housing or an end shield, and to be easily centered therein, so that stator 1 is positioned extremely exactly relative to a rotor located therein, and relative to housing. The advantage of manufacturing centering surface 19 by cutting using cutting tools 11 and 12 is that no burrs or material flares are produced in the cutting process, since cutting tools 11 and 12 move in open space. Via conical centering surface 19, the stator is prevented from tilting when inserted, e.g., in an end shield. Angle 17 is advantageously chosen to be less than 5 degrees. When only two cutting tools 11 and 12 are used, as shown in FIG. 2, they and/or stator 1 must be rotatably supported, so that centering surface 19 may be created on entire outer circumference 7 of stator 1. The present invention is not limited to the use of only two cutting tools, however. Advantageously, several cutting tools are distributed around the circumference of stator 1. When centering surface 19 is not designed conical in shape, but rather circular-cylindrical in shape, it may be realized using several cutting tools and with a single annular cutting tool. Advantageously, a preload force F is applied to laminated core 10 before the cutting process, as shown in FIG. 2. As a result, impermissible plastic deformations, e.g., a fanning of laminations 2 or damage caused when cutting tools 11 and 12 are retracted, are prevented.

Figure 5:
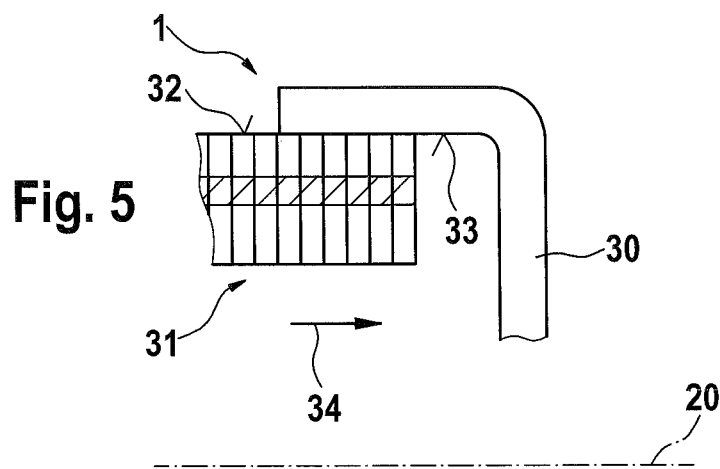
FIG. 5 shows a sectional view of the position of the stator on a housing.
Figure 6:
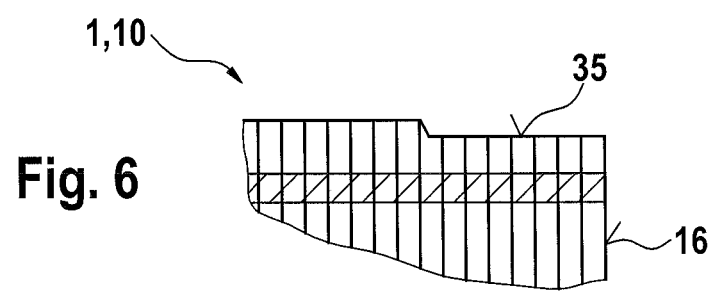
FIG. 6 shows a circular-cylindrical centering surface in a sectional view.

FIG. 5 shows a sectional view of a section of a housing 30, which serves as a receptacle for a laminated core 31. An outside 32 of laminated core 31 interacts with a receiving surface 33 of housing 30. It is possible that laminated core 31 will tilt when it is slid into housing 30 in the direction of arrow 34.

Figure 7:
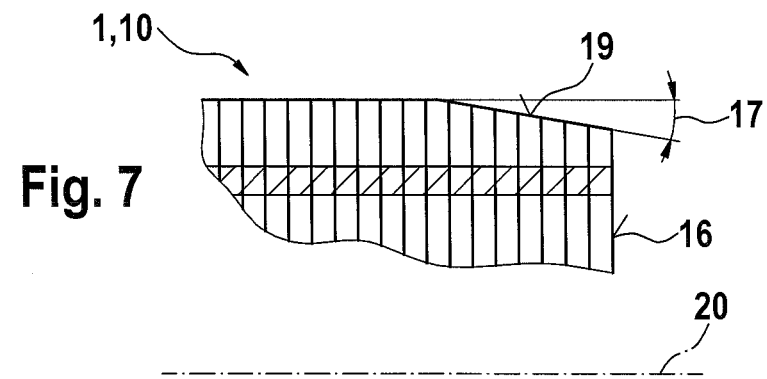
FIG. 7 shows a conical centering surface in a sectional view.

To simplify the insertion and positioning and/or centering of a laminated core in receptacle 33 of housing 30, inventive centering surface 19 shown in the preceding figures is required. A section of inventive stator 1 is shown in sectional views in FIGS. 6 and 7. Laminated core 10 in FIG. 6 includes a cylindrical centering surface 35, and laminated core 10 in FIG. 7 includes conical centering surface 19. To manufacture circular-cylindrical centering surface 35, a single annular cutting lip is advantageously used. Laminations 2 of laminated core 10 are advantageously penetrated completely by the cutting lip. With a conical design of centering surface 19, as shown in FIG. 7, this is not required, since the cutting lip moves in open space.

Figure 8:
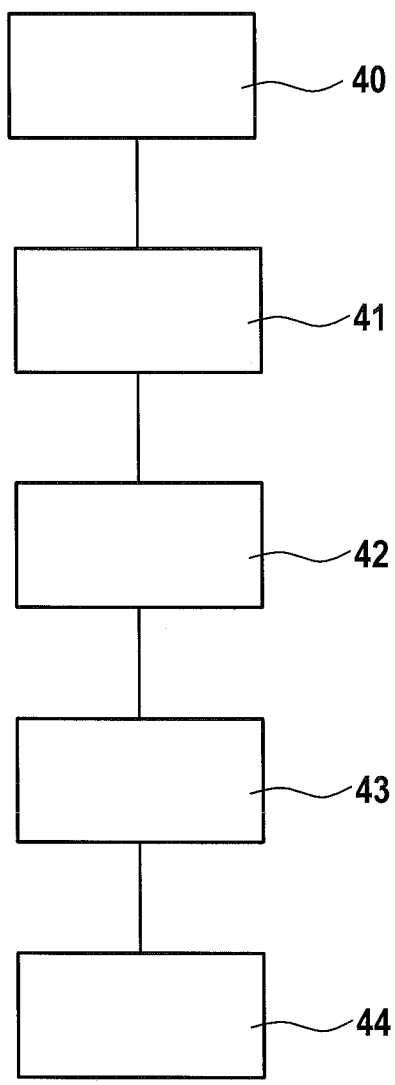
FIG. 8 is a depiction of method steps for manufacturing the radial centering surface.

FIG. 8 depicts a sequence of method steps for manufacturing an inventive stator. In a first step 40, a laminated core is formed using several laminations, which already include inner teeth and/or outer teeth. In second step 41, a desired number of windings is inserted in the slot openings formed by the teeth. In a third step 42, the laminated core—including the windings—is bent round, producing an annular shape. In a fourth step 43, the ends of the laminations, which are diametrically opposed after the laminated core is bent round, are connected with each other in a joining process. In a final step, step 44, cutting is carried out, thereby resulting in an inventive centering surface on the outer circumference of the laminated core. It is clear that the centering surface is manufactured at the end of the value chain. Any damage that occurs at this stage therefore results in high waste costs. An inventive cutting method is therefore significant for the manufacturing process.

Figure 9:
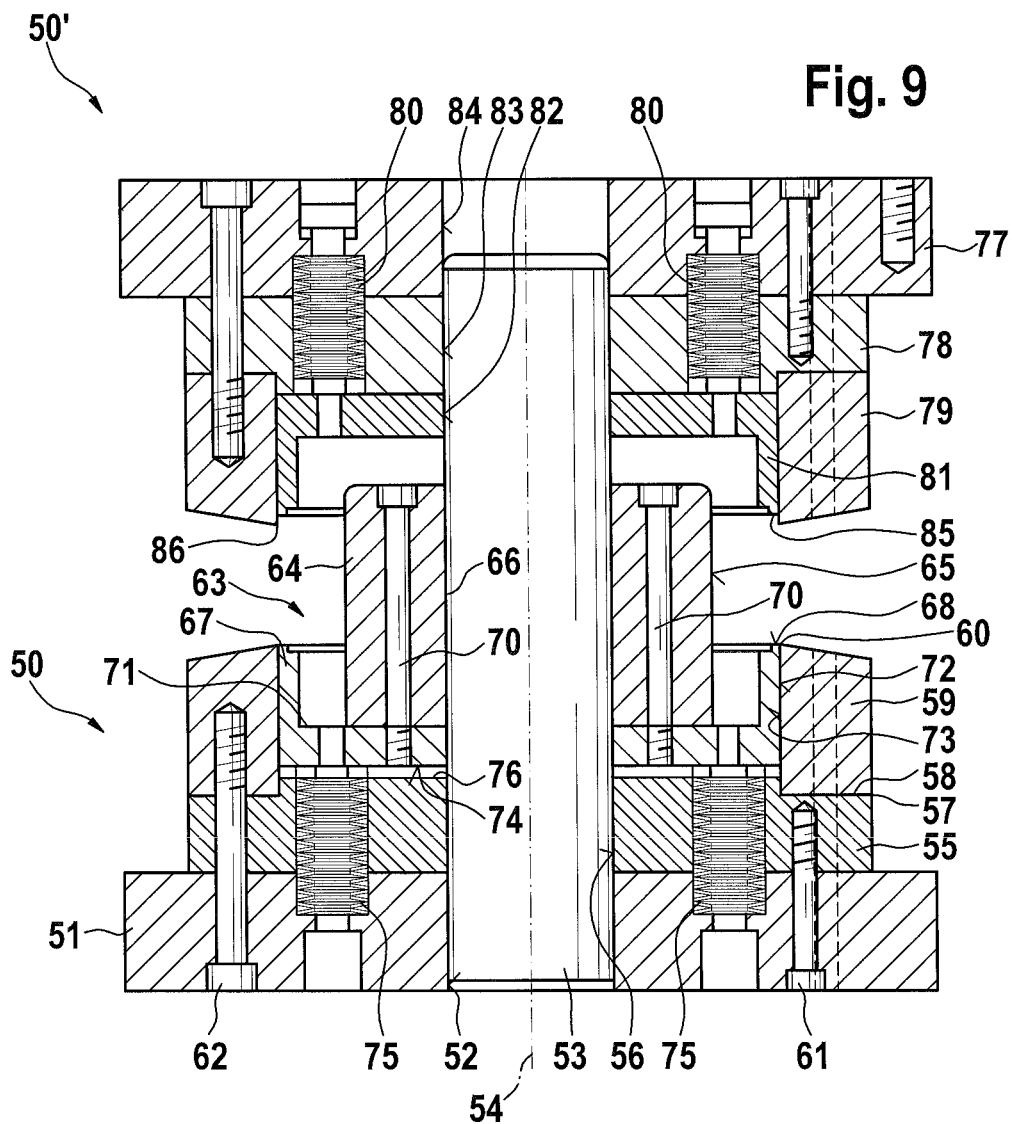
FIG. 9 shows a sectional view of an inventive device for manufacturing the centering surface.
Figure 10:
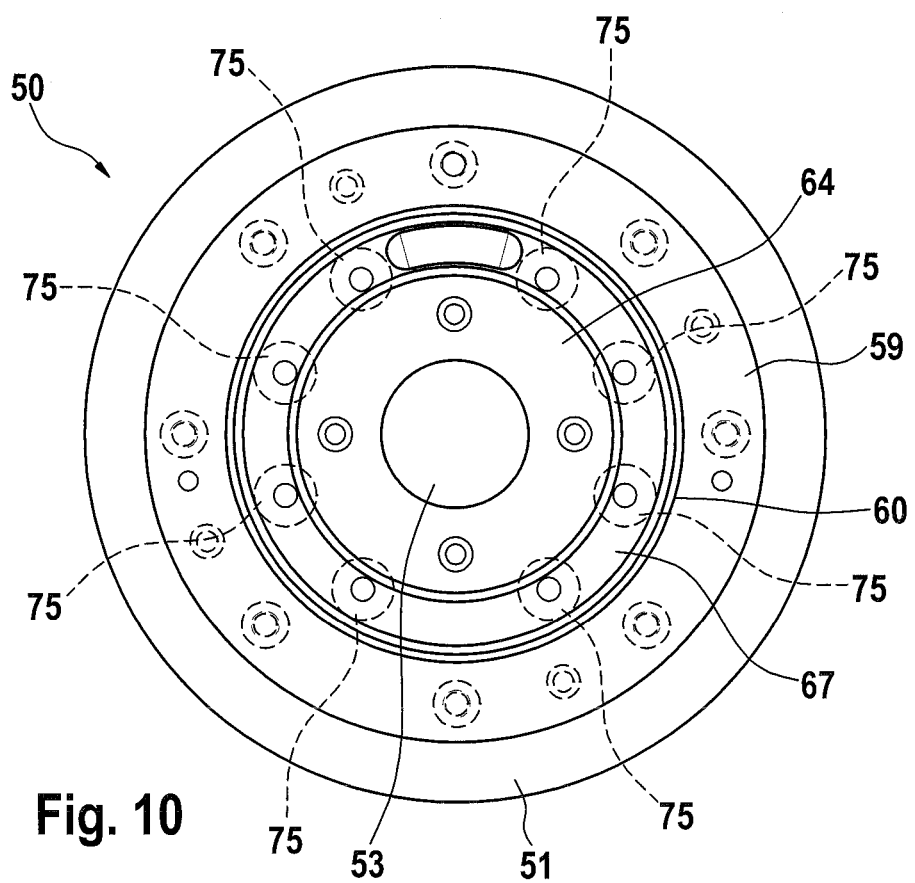
FIG. 10 shows a top view of the inventive device.

FIGS. 9 and 10 show an exemplary embodiment of an inventive device 50 for manufacturing a radial centering surface on an outer circumference of an annular laminated core of a stator. FIG. 9 shows device 50 in a sectional view, and FIG. 10 shows device 50 in a top view. Device 50 includes a circular-cylindrical round plate 51, in the middle of which a circular-cylindrical opening 52 is formed. A centering peg 53 is located in opening 52. Centering peg 53 projects upwardly out of base plate 51, coaxially to axis 54 of base plate 51. An intermediate plate 55 is positioned coaxially on base plate 51. Intermediate plate 55 includes an opening 56, through which centering peg 53 is guided. The diameter of intermediate plate 55 is smaller than the diameter of base plate 51. On its edge 57, intermediate plate 55 includes a receiving shoulder 58, on which a circular-cylindrical cutting tool 59 with a circular-cylindrical cutting lip 60 is located. Cutting lip 60 may also be formed by several curved cutting lips, of course. Cutting lip 59 is centered relative to axis 54 via receiving shoulder 58. Intermediate plate 55 and cutting tool 59 are connected with base plate 51 via screws 61 and 62, which are distributed around the circumference.

A tensioning device 63 is enclosed by cutting tool 59. It includes a centering element 64, outer circumference 65 of which interacts with an inner side of a stator and/or a laminated core, to orient the laminated core on the device. Centering element 64 includes a centering opening 66, through which centering peg 53 is guided. Tensioning device 63 also includes a circular-cylindrical tensioning element 67, on upper side 68 of which a circular-cylindrical recess 69 is formed. Centering device 64 is fastened to a base surface 71 of recess 69 using screws 70. Tensioning element 67 bears via its outer side 72 against an inner side 73 of cutting tool 59. On its underside 74, tensioning element 67 is connected with disc springs 75 distributed around the circumference. There is clearance between underside 74 and a top side 76 of intermediate plate 55. Disc springs 75 are located in intermediate plate 55 and base plate 51. Tensioning element 67 may therefore be moved axially against the spring force of disc springs 75.

A device 50' with a base plate 77, an intermediate plate 78, a cutting tool 79, disc springs 80, and a tensioning element 81—the location and design of which correspond to that of device 50—is positioned as the mirror image to device 50. Centering peg 53 is guided into related centering openings 82, 83 and 84 of tensioning element 81, intermediate plate 78, and base plate 77. Cutting tools 59 and 79 therefore point directly at each other. Disc springs 80 are shown in a tensioned/loaded state, and there is no clearance between tensioning element 81 and intermediate plate 78.

To manufacture the inventive centering surface, an annular laminated core is initially slid onto tensioning device 63, so that an end surface rests on top side 68 of tensioning element 67, and centering device 64 interacts with an inner side of the laminated core. Since disc springs 75 are relieved of tension, top side 68 is initially located above cutting lip 60 of cutting tool 59, so that a portion of the laminated core may extend radially over cutting lip 60. In a second step, device 50' is slid onto centering peg 53, until the other end face of the laminated core rests on a top side 85 of tensioning element 81. Disc springs 80 are also relieved of tension.

By sliding devices 50 and 50' together axially, the laminations of the laminated core are initially preloaded axially via tensioning elements 81 and 67. Disc springs 80 and 75 are tensioned. If the force used to slide devices 50 and 50' together is strong enough, tensioning elements 81 and 67 are slid inward so far that cutting lip 60 of cutting tool 59 and a cutting lip 86 of cutting tool 79 first touch the end faces of the laminated core and then penetrate a portion of the laminations of the laminated core, thereby creating the inventive centering surface. The preload ensures that impermissible plastic deformations—as described above—are prevented.

Figure 11:
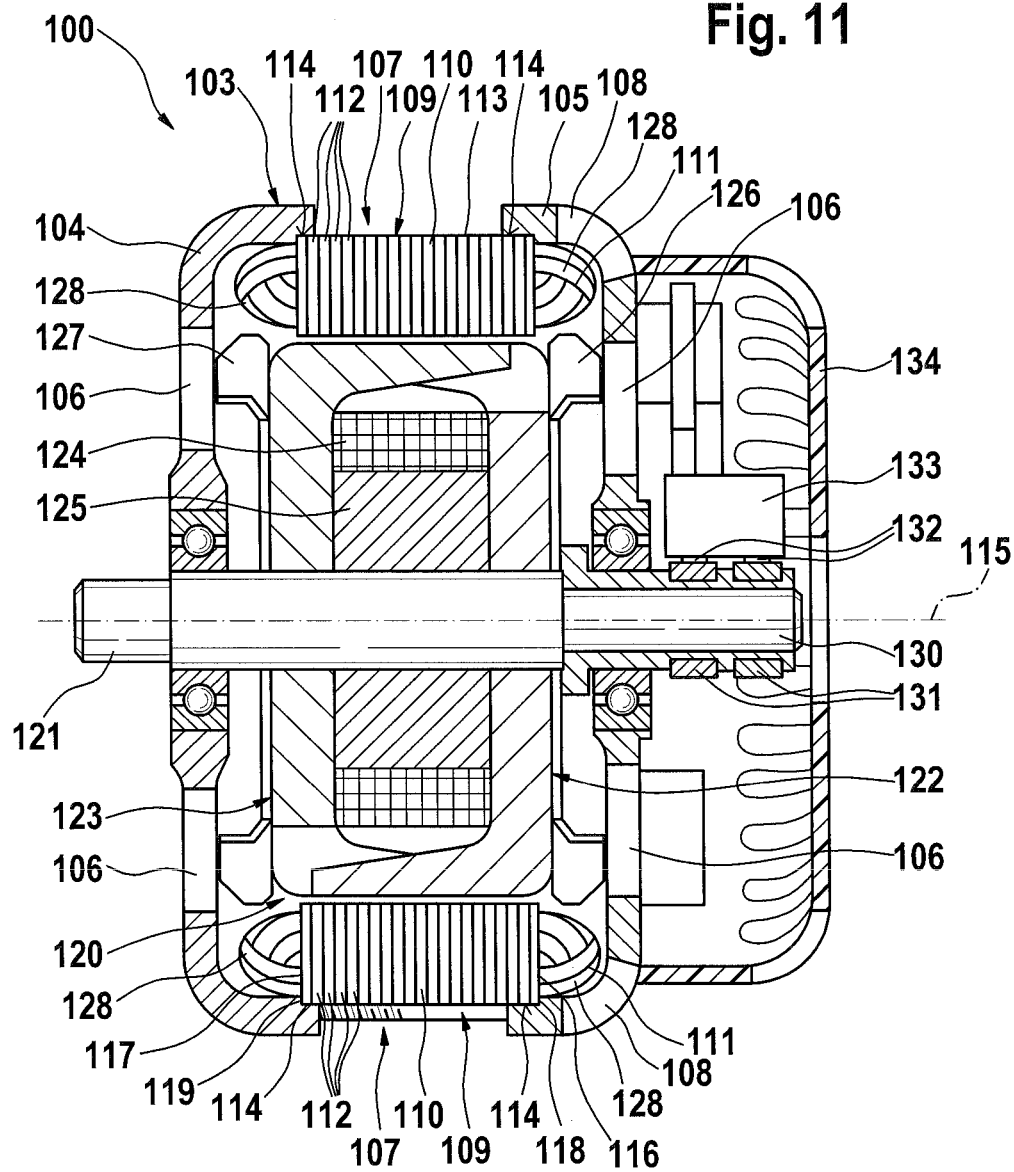
FIG. 11 shows an exemplary embodiment of an inventive electrical machine in a sectional view.

FIG. 11 shows a simplified version of an exemplary embodiment of an electrical machine 100 in a longitudinal sectional view. Electrical machine 100 is designed as an alternating current synchronous generator with a claw-pole rotor 120 with regulated electrical excitation of a pole wheel, e.g., for use in motor vehicles. Electrical machine 100 has a multiple-component metal housing 103, which is formed, e.g., by two end shields 104 and 105, each of which is located on an end face of electrical machine 100. End shields 104 and 105 are pot-shaped in design and include front recesses 106, circumferential recesses 107, and recesses 108 in the corner region, which serve to guide cooling air.

An inventive stator 109 is located between end shields 104 and 105. Stator 109 is composed of a laminated core 110 and a multiphase stator winding 111 located thereon. Laminated core 110 is manufactured using a large number of laminations 112, in a known manner. Stator winding 111 is divided into phase windings, which are accommodated in radially inwardly open grooves of laminated core 110 that extend axially parallel to each other. On its outer circumference 113, laminated core 110 includes radial, inventive centering surfaces 114, which extend out of both end faces 116 and 117, parallel with axis of rotation 115 of stator 109, and which are cylindrical in shape. An annular surface 118, 119 directly abuts centering surfaces 114 on the end faces, so that end shields 103 und 104 are centered relative to each other by bilateral centering surfaces 114 of stator 109, and stator 109 is clamped in place axially by surfaces 118, 119 of the two end shields 104 and 105. Claw-pole rotor 120 with a rotor shaft 121 is located inside cylindrical laminated core 110, and it is rotatably supported in end shields 104 and 105.

Two oppositely poled pole wheel halves 122 and 123 are mounted on rotor shaft 121 of claw-pole rotor 120. Each pole wheel half 122, 123 is composed of iron, is solid in design, and includes a large number of claws around its circumference. The claws extend in the axial direction, are essentially trapezoidal in shape, and are located in the circumferential direction with equal angular division. The two pole wheel halves 122, 123 are positioned on rotor shaft 121 such that they are diametrically opposed to each other, and their claw-type pole fingers are intermeshed, as alternating south and north poles. They overlap toroidal-coil shaped excitation winding 124 located on pole body 125, which keeps the two pole wheel halves 122, 123 separated. Fans 126 and 127 are located on the axial, outwardly pointing end surfaces of pole wheel halves 122 and 123, and they are non-rotatably mounted on pole wheel halves 122 and 123. Air flows created by fans 126 and 127 enter axially through front recesses 106 of end shields 104 and 105 and into electrical machine 100, and exit radially through circumferential recesses 107 of end shields 104 and 105. Winding overhangs 128 of stator winding 111 are located in the radial cooling air flow.

A slip-ring pair 131 is located on an end 130 opposite to drive side 129 of rotor shaft 121, which serves to provide current to excitation winding 124. The direct current of excitation winding 124 produces a magnetic field, which is at a standstill relative to claw-pole rotor 120. Due to the rotation of claw-pole rotor 120, however, a rotating magnetic field is produced for stator 109. This rotating field rotates with a number of rotations that is synchronous with that of claw-pole rotor 120, and it induces an alternating voltage in every phase winding of stator winding 111. The individual alternating voltages in the phase windings are displaced with respect to time relative to each other by the same angle (phase difference) such that the phase windings are located around the circumference of stator 109 with space between them. For a symmetrical, three-strand winding, for example, the three sinusoidal alternating voltages are displaced by 120° relative to each other with respect to time. The same applies for alternating currents.

Carbon brushes 132, which are pressed against the surface of slip rings 131, are supported in a brush holder, which forms a unit together with a regulator 133, which regulates the alternating voltages induced in the windings to a constant voltage that is independent of rotational speed and load.

The alternating current given off by stator winding 111 is supplied via a rectifier circuit to the electrical system, e.g., of a motor vehicle. The rectifier system is located on the exterior of end shield 105. The rectifier system and regulator 133 are covered by a protective cap 134 mounted on end shield 105.

Figure 12:
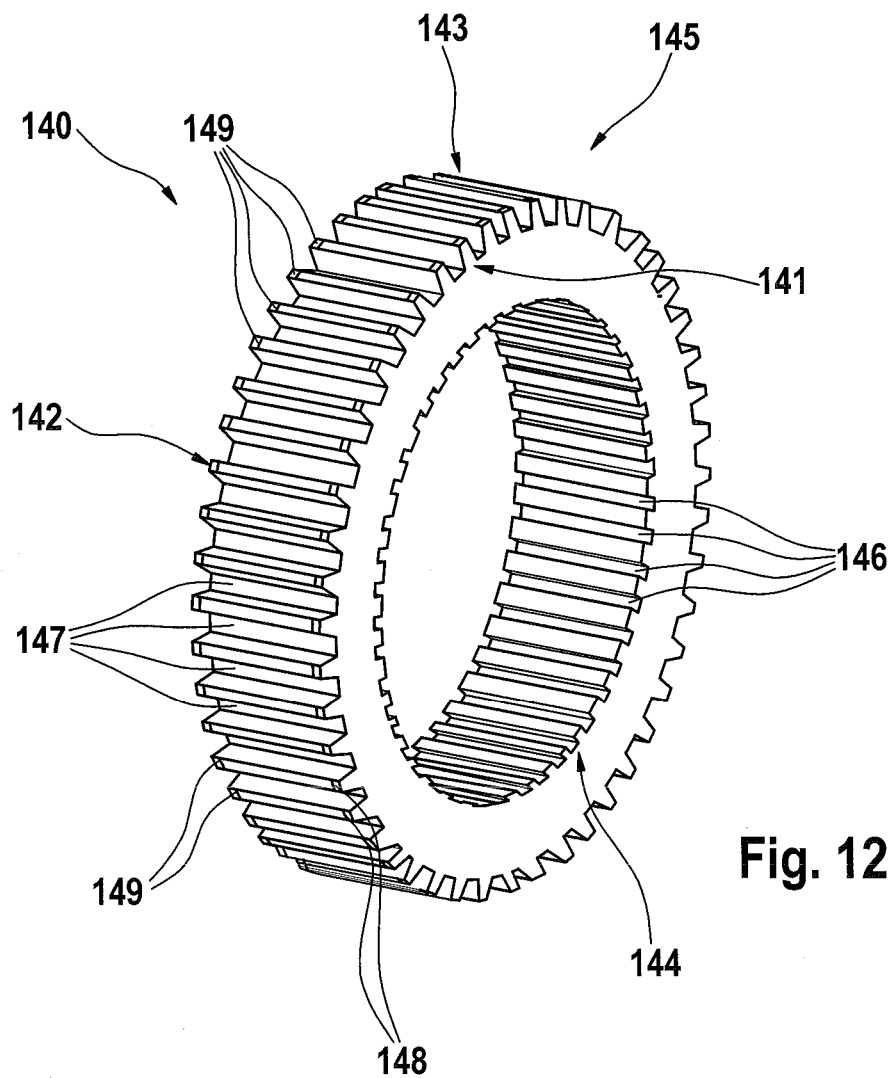
FIG. 12 shows a further exemplary embodiment of an advantageous stator.
Figure 13A:
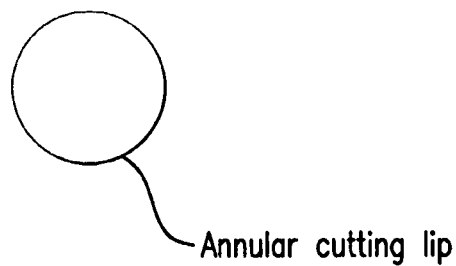
FIG. 13A depicts an annular cutting lip.
Figure 13B:
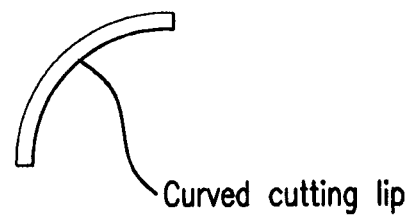
FIG. 13B depicts a curved cutting lip.
Figure 13C:
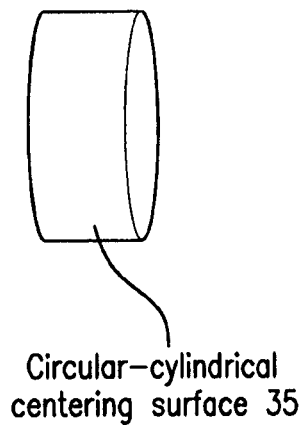
FIG. 13C depicts a circular-cylindrical centering surface 35.

FIG. 12 shows a perspective view of a further exemplary embodiment of an inventive stator 140. To manufacture a stator 140 of this type, which is provided for an electrical machine, particularly for an alternating current-synchronous generator with a claw-pole rotor for motor vehicles, as shown in FIG. 11, strip-shaped laminations are used to form an essentially cuboid laminated core, which is bent round in one of the subsequent steps to form an annular shape. The annular shape of this stator 140 or stator core has an axial direction that corresponds to the axis of a cylinder, and it includes two axial end faces 141, 142. Initially, individual laminations are punched out of sheet metal, composed of a yoke strip with a yoke height that is constant along the entire longitudinal axis of the laminations, and with diametrically opposed, perpendicularly projecting rows of teeth 143, 144. A winding will be accommodated later in the slots of the laminated core formed by the adjacent, longer teeth. After they are punched out, the essentially cuboid, strip-shaped laminations are stacked by placing several of these laminations on top of each other to form an essentially cuboid laminated core, and they are oriented exactly, so that the contours of the laminations are aligned as perfectly as possible. This laminated core, which has been shaped in this manner, is pressed together with no gaps via application of a defined force in the stacking direction, to then connect the laminations with each other in a suitable, predetermined position using a suitable connecting technique, preferably welding. Laser welding is particularly well-suited in this case, since it results in a distortion-free laminated core while generating the least possible amount of heat. This connecting process results in a connected laminated core, which forms stator core 145, which includes teeth and slots on one side, which point toward each other and which are common for a stator. A pre-fabricated core winding (not shown here) is nearly flat in shape, and it is subsequently placed in the slots of the essentially flat core. The combination of core and core winding is then bent round such that a hollow cylindrical stator with radially inwardly directed slots 146 and/or radially outwardly directed slots 147 is produced. The laminated core is bent round under axial preload. Impermissible plastic deformations, e.g., a fanning and waving of the laminations, are thereby prevented. After the essentially cuboid laminated core is bent round under axial preload, the two end surfaces are directly opposite to each other and essentially bear against each other. In this annular state of the laminated core, the two facing ends of the laminated core are connected with each other. This connecting process is preferably carried out using laser welding. This welded connection extends, e.g., in the axial direction on the outer circumference of the laminated core.

Stator 140 includes a stator core and a stator winding (not shown here), which is accommodated by the stator core. The stator winding is electrically separated from the stator core by an insulation that is placed in the slots and bears against the slot wall. The stator winding is multiple-poled and multiphase. The phase windings are distributed symmetrically in the slots, are designed as coil windings, and are subdivided into individual winding sections, which are shaped according to a predetermined pattern that repeats regularly around the circumference. A winding section is formed essentially in an oval extending parallel to the axial direction, around which an electrical line with a predetermined number of windings is formed. The lines that fill a slot may be located loosely on top of each other and next to each other, and/or they may be positioned in a regular manner, e.g., they may be stacked on top of each other in the direction of the slot depth. The line is composed of winding wire, which is usually insulated with varnish. The winding wire for the lines filling a slot may have a uniform cross-sectional shape, e.g., a circular cross section, or an essentially rectangular cross section. The winding wire for the lines filling a slot may also have a non-uniform cross-sectional shape. For example, the winding wire may have a circular cross section in the initial state, and then, in a subsequent fabrication step, it may be stamped—together with the wires filling the slots—in the region of the slots of the laminated core into the slot shape of the round stator, thereby giving it a cross section that may range from circular to multiform. The wires lying in the groove may have cross-sectional shapes with different forms, i.e., their cross-sectional shapes may differ from each other.

The winding sections are guided through the slot openings into the slots, i.e., into slot pairs, which are separated by approximately one pole division, which corresponds, e.g., to three slot divisions in the case of a twelve-poled alternating-current stator with 36 slots. Due to the increased requirements in terms of current demand placed on modern generators, the large currents also require a large line cross-section. To ensure that the manufacture and assembly of the winding is not made unnecessarily difficult, and to prevent additional losses that occur in large line cross-sections, subdivided lines are used, in the form of several (usually two) parallel wires.

Inventive centering surfaces 148 and 149, which are also created via cutting, are formed on stator 140.

What is claimed is:

1. A method for manufacturing at least two radial centering surfaces on an outer circumference of an annular laminated core of a stator, comprising the steps of forming a cuboid laminated core by laminating strip-shaped laminations and bending the laminations round to form an annular shape of the core, wherein the annular-shaped core is a stator with a hollow cylindrical form and a central axis extending between first and second opposing axial ends;

preloading the laminated core axially before cutting and during cutting;

creating the centering surfaces on an outer circumference by cutting the annular laminated core with at least two cutting tools, and positioning the at least two cutting tools such that one cutting tool cuts a centering surface starting at the first axial end of the stator and another cutting tool cuts another centering surface starting at the second axial end of the stator, wherein the at least two radial centering surfaces on said outer circumference of the annular laminated core are created from both sides of the laminated core.

2. The method as recited in claim 1, wherein said cutting includes cutting with at least one of the cutting tools with at least one cutting lip selected from the group consisting of an annular cutting lip and a curved cutting lip.

3. The method as recited in claim 1, further comprising, when the centering surface is manufactured, moving the cutting tools so far that at least one lamination of the laminated core is penetrated completely by a cutting lip.

4. The method as recited in claim 1, wherein the cutting tool is guided at an angle to the axis of the laminated core, thereby resulting in a conical centering surface.

5. The method as recited in claim 4, wherein the angle is chosen to be less than 5 degrees.

* * * * *